United States Patent [19]
Stevens

[11] Patent Number: 5,867,229
[45] Date of Patent: *Feb. 2, 1999

[54] VIDEO EFFECTS USING A VIDEO RECORD/ PLAYBACK DEVICE

[75] Inventor: Rex H. Stevens, Aloha, Oreg.

[73] Assignee: Tektronix, Inc., Wilsonville, Oreg.

[ * ] Notice: This patent issued on a continued prosecution application filed under 37 CFR 1.53(d), and is subject to the twenty year patent term provisions of 35 U.S.C. 154(a)(2).

[21] Appl. No.: 834,615

[22] Filed: Apr. 14, 1997

Related U.S. Application Data

[63] Continuation of Ser. No. 334,170, Nov. 3, 1994, abandoned.

[51] Int. Cl.$^6$ .................................................... H04N 5/222
[52] U.S. Cl. ................................................ 348/722; 386/4
[58] Field of Search ................................. 348/564, 565, 348/567, 722; 386/4, 46, 52, 83; H04N 5/222

[56] References Cited

U.S. PATENT DOCUMENTS

| | | | |
|---|---|---|---|
| 4,754,342 | 6/1988 | Duffy | 360/14.3 |
| 5,050,003 | 9/1991 | Horii et al. | 358/342 |
| 5,134,499 | 7/1992 | Sata et al. | 358/342 |
| 5,172,242 | 12/1992 | Yamaguchi et al. | 358/342 |
| 5,181,114 | 1/1993 | Richards et al. | 348/722 |
| 5,182,640 | 1/1993 | Takano | 348/722 |
| 5,278,662 | 1/1994 | Womach et al. | 348/722 |
| 5,335,081 | 8/1994 | Yamaguchi et al. | 358/342 |
| 5,347,322 | 9/1994 | Levine et al. | 348/722 |
| 5,355,450 | 10/1994 | Garmon et al. | 348/722 |
| 5,418,622 | 5/1995 | Takeuchi | 348/722 |
| 5,438,372 | 8/1995 | Tsumori et al. | 348/564 |
| 5,448,315 | 9/1995 | Soohoo | 348/722 |
| 5,450,140 | 9/1995 | Washino | 348/722 |

OTHER PUBLICATIONS

W. D. Sincoskie, System Architechture for a Large Scale Video on Demand Service, Computer Networks and Systems, pp. 155–162, 1991.

*Primary Examiner*—Brian Casler
*Assistant Examiner*—Luanne P. Din
*Attorney, Agent, or Firm*—Francis I. Gray

[57] ABSTRACT

A multiple access record/playback device, such as a digital disk recorder, is used for video effects, such as simultaneously providing a preview video signal and a time offset production video signal of the same video image or simultaneously providing multiple views of the same video image. An input video signal is selected from a plurality of input video signals for storing on the multiple access record/playback device. The input video signal is read out for display from the multiple access record/playback device from an identified start point at two times to provide simultaneously a preview video signal and a time offset production video signal for the same video image. Alternatively the plurality of input video signals of the same video image are stored simultaneously on the multiple access record/playback device, and one of the plurality of input video signals is selected for reading out for display from an identified start point at two times to provide simultaneously the preview video signal and the time offset production video signal. For analysis the plurality of input video signals stored on the multiple access record/playback device may be read out for display synchronously and simultaneously for analysis of the video image from different views.

6 Claims, 2 Drawing Sheets

VIDEO EFFECTS USING A VIDEO RECORD/PLAYBACK DEVICE

This is a continuation of application Ser. No. 08/334,170, filed Nov. 3. 1994 and now abandoned.

BACKGROUND OF THE INVENTION

The present relates to applications for a video record/playback device, and more particularly to video effects using a multiple access video record/playback device for providing time separated and multiple time synchronous images.

In a television broadcast environment often a commentator has a display presented that represents a subject about which the commentator is speaking, such as a replay for a sporting event. Currently using linear video tape recorders the commentator sees the display at the same time that it is being broadcast to viewers. Alternatively multiple views of an image may be made synchronously. Generally these views are recorded on separate video tracks of a video tape recorder. However only one view may be played back at a time. It would be advantageous for the commentator to be able to see the subject about which he/she is speaking prior to the subject being broadcast to viewers. Also it would be advantageous to be able to view multiple views of the same image from the record/playback device simultaneously for analysis in real time.

SUMMARY OF THE INVENTION

Accordingly the present invention provides video effects using a multiple access video record/playback device that allows a commentator to preview an image prior to the image being broadcast or to view simultaneously multiple views of the same image for analysis. A multiple access video record/playback device, such as a video disk recorder, records one or more views of an image. Upon selection by an operator one view of the image may be played back instantly as a preview image, and the same view of the image may be played back delayed by a specified interval to provide a production image. The specified interval may be less than the duration of the view so that the same view is being played simultaneously, either on separate monitors or on a split screen monitor, although offset by such specified interval. Alternatively for multiple views of the same image, the multiple views may be played back synchronously so that the views may be viewed simultaneously in real time, either on separate monitors or a split screen monitor.

The objects, advantages and other novel features of the present invention are apparent from the following detailed description when read in conjunction with the appended claims and attached drawing.

DESCRIPTION OF THE PREFERRED EMBODIMENT

Figure 1:
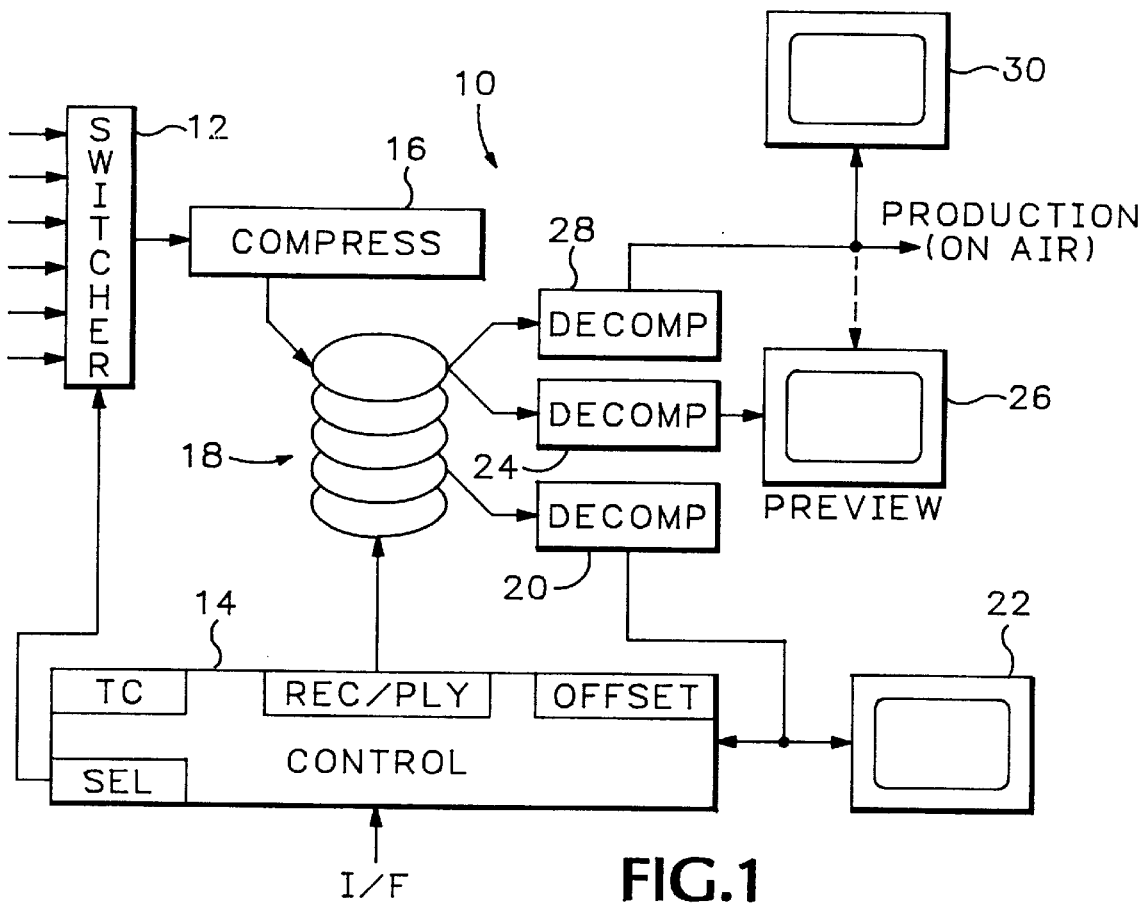
FIG. 1 is a block diagram view for simultaneously previewing and airing a video image stored on a multiple access record/playback device according to the present invention.

Referring now to FIG. 1 a production video switcher 12 has a plurality of video inputs from various video sources, such as cameras, video tape recorders, off air and the like. An operator interfaces with a control system 14 to provide a control signal for the switcher 12 to select one of the input video signals as an output video signal. The output video signal from the switcher 12 is input to an optional compression circuit 16 to produce a compressed video signal. The compressed video signal is then recorded on a multiple access storage device 18, such as a video disk recorder, under control of the control system 14. To play back a selected portion of the compressed video signal from the storage device 18, a start point is detected by searching through the compressed video signal, i.e., reading the compressed video signal from the storage device 18 under control of the control system 14. The compressed video signal is input to an optional decompression circuit 20 to recover the original broadband video signal. The broadband video signal is displayed on a local monitor 22 and the associated time code is input to the control system 14. When the start point is located, the time code is stored in a time code register in the control system 14. The operator then determines a time offset, which is stored in an offset register in the control system 14.

Figure 2:
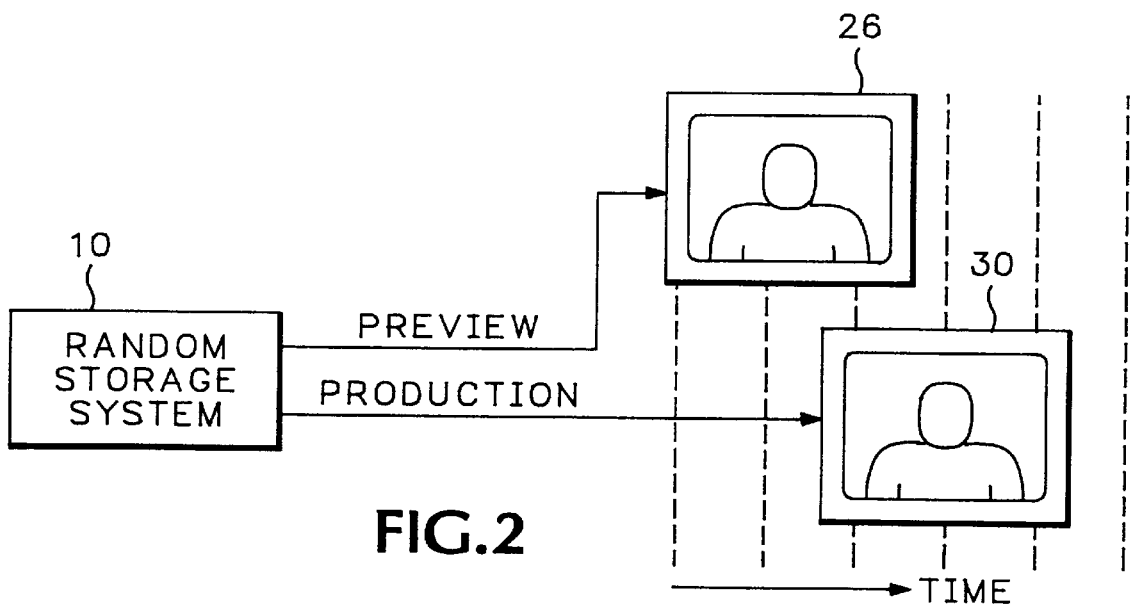
FIG. 2 is a conceptual view of the simultaneous previewing and airing according to the present invention.

When the requested video segment is played back from the storage device 18, the control system 14 uses the time code in the time code register as the start point and sequentially plays back, or reads out, the video segment from that point. The compressed video segment is input to an optional preview decompression circuit 24, and the resulting broadband preview video is displayed on a preview monitor 26. Simultaneously starting at a later time determined by the time in the offset register the same video segment starting at the same start point is read out and input to an optional production decompression circuit 28. The broadband production video signal from the production decompression circuit 28 is displayed on a production monitor 30 as well as being broadcast on the air. Alternatively the production video signal may be displayed on the preview monitor 26 in a split screen mode. As shown in FIG. 2 this results in the same video segment being shown on the air a short time later than the preview so that an announcer or commentator may "predict" what the viewer is going to see.

Figure 3:
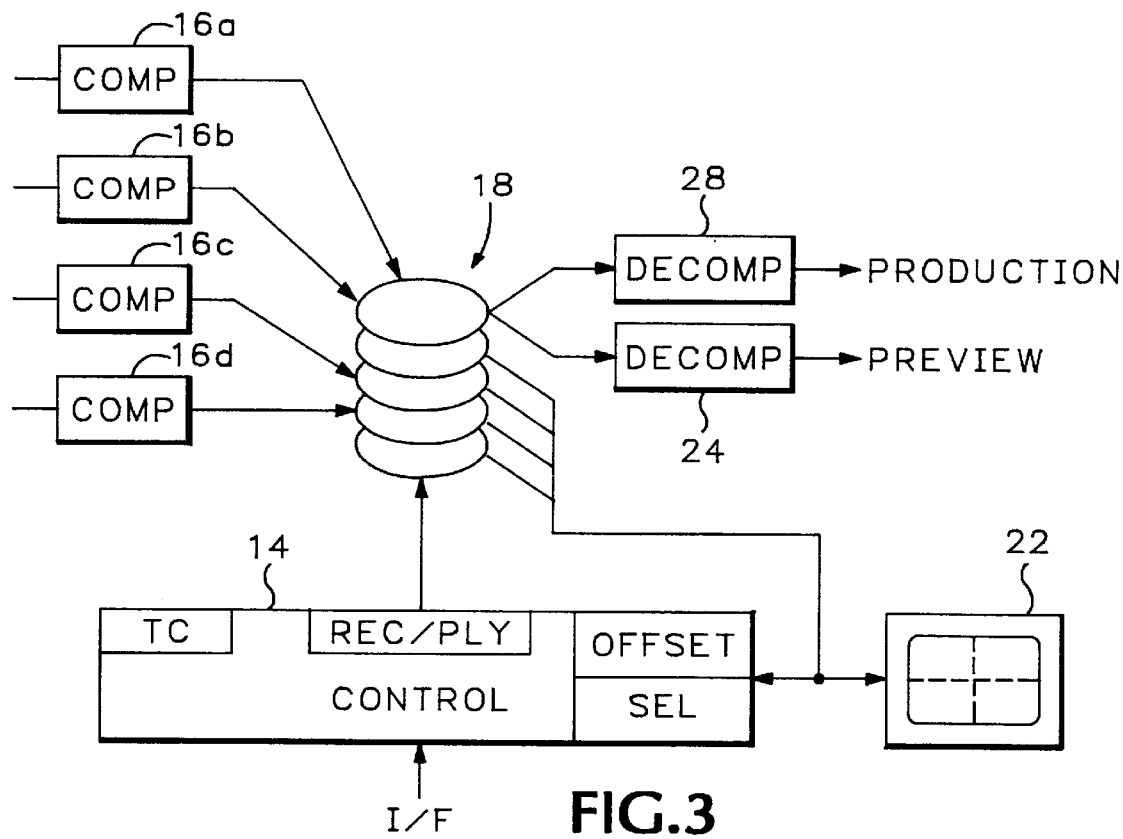
FIG. 3 is a block diagram view of an alternate embodiment for simultaneously previewing and airing a video image and simultaneously viewing multiple views of the video image according to the present invention.

Alternatively as shown in FIG. 3 multiple video signals from different sources, such as cameras, off air, video recorders or the like, may be input to the storage device 18 simultaneously via respective optional compression circuits 16a–d. The multiple compressed video signals, four shown in this example, may be searched one at a time or simultaneously as for a single compressed video signal and displayed on the local monitor 22 in a split screen format, or the local monitor may be replaced with four local monitors, one for each compressed video signal. The operator, based upon the four views, selects not only the start point for a video segment, but also which one of the compressed video images to use for playback. Again the time code and offset are stored in the respective registers, and when playback is requested the selected compressed video signal segment is read out to the preview decompression circuit 24 and subsequently simultaneously to the production decompression circuit 28 as described above. In this manner the source to be used for playback does not need to be determined before an event, but may be determined after an event.

Figure 4:
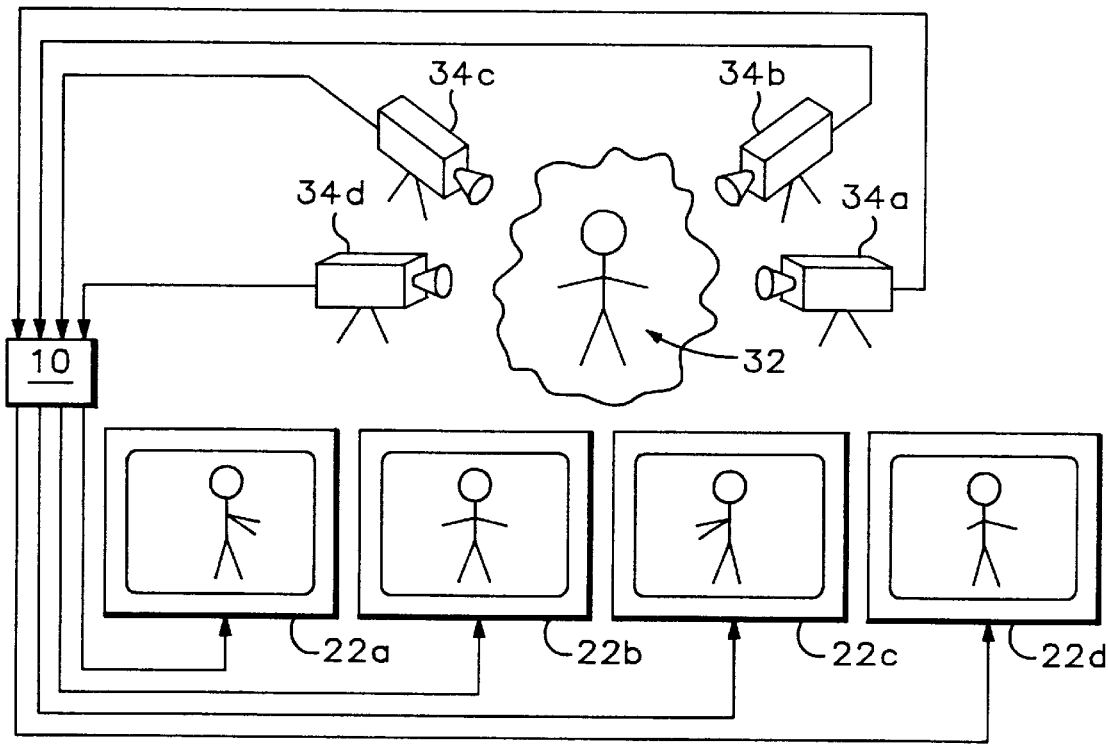
FIG. 4 is a conceptual view of a system for simultaneously viewing multiple views of a video image according to the present invention.

FIG. 4 shows an event, indicated by the stick FIG. 32, being simultaneously recorded via four different video cameras 34 a–d. The four views of the same event are stored in the random storage system 10, and then may be played back synchronously and simultaneously as four displays. In this manner a single event may be analyzed in real time or slow motion at the same time without requiring mental correlation and synchronization of the event for individual views. For example for instant replay at a sporting event, the replay referee sees the same image from different views simultaneously rather than having to look at each view separately in sequence. With the stop action and slow motion control this provides great flexibility while reducing the time required for the analysis.

Thus the present invention provides preview and simultaneous views of an event by using a multiple access storage device, such as a digital video disk recorder, for storing the video, either one or multiple views at the same time, and then playing back the stored video either offset for preview or as synchronized multiple views for analysis.

What is claimed is:

1. An apparatus for producing video effects comprising:

a multiple random-access video record/playback device:

means for storing a video signal on the multiple random-access video record/playback device, the video signal being a continuously received video signal;

means while storing the video signal for simultaneously reading out a requested video segment of the video signal from the multiple random-access video record/playback device as two output video signals at an arbitrary time delay from the video signal being stored, one output video signal being read out offset in time from the other output video signal by a programmable amount determined by an operator; and means for simultaneously displaying the two output video signals from the reading out means for the operator.

2. The apparatus as recited in claim 1 wherein the storing means comprises means for storing a plurality of video signals simultaneously on the multiple random-access record/playback device, the apparatus further comprising means for selecting one of the plurality of video signals from the multiple random-access record/playback device as the video signal from which the requested video segment is read out from the reading out means.

3. The apparatus as recited in claim 1 wherein the storing means comprises means for storing a plurality of video signals simultaneously on the multiple access record/playback device, the video signals representing different views of a video scene, and wherein the reading out means comprises means for reading out the plurality of video signals simultaneously for display by the displaying means while storing the plurality of video signals.

4. A method of providing simultaneous, time offset arbitrary views of a requested video segment from a single video signal that is being continuously received using a multiple random-access record/playback device comprising the steps of:

storing the single video signal on the multiple random-access record/playback device;

identifying a start point in the single video signal for reading out the requested video segment while storing the single video signal;

reading out for display the requested video segment from the start point as a first arbitrary time; and reading out for display the requested video segment from the start point at a second time offset from the first arbitrary time by a programmable time interval.

5. The method as recited in claim 4 wherein the storing step comprises the step of storing simultaneously a plurality of video signal and further comprising the step of selecting for input to the identifying and reading out steps one of the plurality of video signal.

6. The method as recited in claim 4 wherein the storing step comprises the step of storing simultaneously a plurality of video signal representing different views of a video scene, and the reading out step comprises the step of reading out simultaneously for display the plurality of video signals from a start point identified in the identifying step for at least one of the plurality of video signals.

* * * * *